(12) United States Patent
Fei et al.

(10) Patent No.: US 9,507,890 B2
(45) Date of Patent: Nov. 29, 2016

(54) DETECTING APPLIANCES IN A BUILDING FROM COARSE GRAINED METER DATA WITH PARTIAL LABEL

(71) Applicant: International Business Machines Corporation, Armonk, NY (US)

(72) Inventors: Hongliang Fei, Millwood, NY (US); John Hutchinson, Toms River, NJ (US); Younghun Kim, White Plains, NY (US); Sanjay K. Mamidipalli, Kennesaw, GA (US); Milind R. Naphade, Fishkill, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 14/041,789

(22) Filed: Sep. 30, 2013

(65) Prior Publication Data

US 2015/0046131 A1    Feb. 12, 2015

Related U.S. Application Data

(63) Continuation of application No. 13/961,332, filed on Aug. 7, 2013.

(51) Int. Cl.
| | |
|---|---|
| *G06F 7/60* | (2006.01) |
| *G06F 17/10* | (2006.01) |
| *G06F 17/50* | (2006.01) |
| *G06Q 50/06* | (2012.01) |

(52) U.S. Cl.
CPC .......... *G06F 17/5009* (2013.01); *G06Q 50/06* (2013.01); *G06F 2217/16* (2013.01)

(58) Field of Classification Search
CPC .......... G06F 17/5009; G06F 17/5004; G06F 2217/16; G06Q 50/06; G01R 31/34
USPC .......................................................... 703/2
See application file for complete search history.

(56) References Cited

U.S. PATENT DOCUMENTS

| | | | |
|---|---|---|---|
| 7,693,670 B2 | 4/2010 | Durling et al. | |
| 8,311,863 B1 | 11/2012 | Kemp | |
| 8,412,491 B2 | 4/2013 | Souilmi | |
| 2011/0046904 A1* | 2/2011 | Souilmi | G01D 4/004 702/62 |
| 2011/0185196 A1* | 7/2011 | Asano | B60L 11/1809 713/300 |
| 2011/0185198 A1 | 7/2011 | Ukita et al. | |
| 2011/0251807 A1 | 10/2011 | Rada et al. | |
| 2012/0136593 A1 | 5/2012 | Donaldson et al. | |
| 2013/0066479 A1 | 3/2013 | Shetty et al. | |

(Continued)

OTHER PUBLICATIONS

Sawyer, Rebecca L., et al., "Creating Low-Cost Energy-Management Systems for Homes Using Non-Intrusive Energy Monitoring Devices", 2009, IEEE.*

(Continued)

*Primary Examiner* — Cedric D Johnson
(74) *Attorney, Agent, or Firm* — Scully, Scott, Murphy & Presser, P.C.; Keivan Razavi

(57) ABSTRACT

Detecting appliance in a building, in one aspect, may comprise receiving meter data associated with energy consumption, the meter data comprising at least energy consumption data associated with usage of the appliance, receiving customer data associated with the meter data, extracting features for training a model for detecting the appliance, based on at least the meter data and the customer data, and constructing the model based on the features.

9 Claims, 12 Drawing Sheets

(56) References Cited

U.S. PATENT DOCUMENTS

| | | | |
|---|---|---|---|
| 2013/0103215 A1 | 4/2013 | Dai et al. | |
| 2013/0110621 A1 | 5/2013 | Gupta et al. | |
| 2013/0173064 A1* | 7/2013 | Fadell | G05D 23/1902 700/276 |
| 2013/0289788 A1* | 10/2013 | Gupta | G05B 13/02 700/291 |

OTHER PUBLICATIONS

Marinescu, Andrei et al., "Residental Electrical Demand Forecasting in Very Small Scale: An Evaluation of Forecasting Methods", May 18, 2013, International Workshop for Software Engineering Challenges for the Smart Grid (SE4SG), IEEE.*

Onoda, Takashi et al., "Experimental Analysis of Support Vector Machines with Different Kernels based on Non-Intrusive Monitoring Data", 2002, IEEE.*

Fensel, Anna et al., Sesame-S: Semantic Smart Home System for Energy Efficiency, Jul. 2012, Conference Paper, Research Gate.*

Dong, Bing et al., A Holistic Utility Bill Analysis Method for Baselining Whole Commercial Building Energy Consumption in Singapore, 2004, Energy and Buildings 37, Elsevier, B.V.*

Anonymous; Ttl: Meter on electricity use and appliances gets smarter; Journal Ttl: Professional Engineering, vol. 20, No. 13, pp. 4-4; Jul. 11, 2007; Publisher: Mechanical Engineering Publications Ltd.; Country of Publication: UK; ISSN: 0953-6639; Database: CSA Technology Research Database.

Office Action dated May 2, 2016 received in U.S. Appl. No. 13/961,332, 23 pages.

* cited by examiner

DETECTING APPLIANCES IN A BUILDING FROM COARSE GRAINED METER DATA WITH PARTIAL LABEL

CROSS-REFERENCE TO RELATED APPLICATIONS

This application is a continuation of U.S. Ser. No. 13/961,332, filed on Aug. 7, 2013, the entire content and disclosure of which is incorporated herein by reference.

FIELD

The present application relates generally to buildings and appliances in a building, energy efficiency in buildings and improvements thereof, and more particularly to detecting appliances in a building from coarse grained meter data with partial label.

BACKGROUND

The research topics on appliance detection problem can be classified into two categories based on the difference of hardware and software deployment. One uses single sensor to monitor the power outlet or multiple sensors to measure the electrical information of individual appliance. Special technical expertise is usually required for single sensor deployment, and multiple sensor installation and maintenance incur high cost. The other utilizes data mining techniques to disaggregate overall consumption data into individual device level and associate different levels of consumption to existing appliance feature (signature) database. The consumption data is typically sampled at high frequency. In addition, the prior knowledge about appliance consumption (signature) is difficult to obtain.

BRIEF SUMMARY

A method for detecting appliance in a building, in one aspect, may comprise receiving meter data associated with energy consumption, the meter data comprising at least energy consumption data associated with usage of the appliance. The method may also comprise receiving customer data associated with the meter data. The method may further comprise extracting features for training a model for detecting the appliance, based on at least the meter data and the customer data. The method may further comprise constructing the model at least based on the features. The method may further comprise applying the model to candidate meter data associated with a candidate customer, for detecting whether the candidate customer is using the appliance.

A system for detecting appliance in a building, in one aspect, may comprise a module operable to receive meter data associated with energy consumption, the meter data comprising at least energy consumption data associated with users of the appliance. The module may be further operable to receive customer data associated with at least the users of the appliance. The module may be further operable to extract features for training a computer model for detecting the appliance, based on at least the meter data and the customer data. The module may be further operable to construct the computer model based on the features. The module may be further operable to apply the model to candidate meter data associated with a candidate customer, for detecting whether the candidate customer is using the appliance.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment of the present disclosure, a method and a system may be provided for determining if a household is using a particular appliance by extracting features associated with that appliance from smart meter data. Household are outfitted with smart meters to communicate electricity usage. Without any special devices or special data, the ordinary low frequency electricity usage data of a household can contain features that are indicative of certain appliances. Mining information from that data can provide insightful information, particularly, detecting appliances installed and/or used in the household.

For example, features can be determined empirically for differences between an electric water heater and a non-electric water heater. These features further can be matched against data sources, e.g., data from customers of a power utility to determine whether or not the household has an electric or non-electric water heater. In particular, smart meter data can be used to identify particular appliance consumption patterns, which can be used to determine whether there is an electric water heater unit or not. Similarly, features may be extracted from meter data and used to determine heap pump and non-heap pump usage in a household. This knowledge can be useful for a number of parties including the government, appliance manufacturers, power utilities and marketing companies.

In one aspect of the present disclosure, a set of empirical and generic features may be provided for automatically identifying relevant features for detecting different types of appliances. For instance, dictionary of empirical features and other machine learning features that represent electric water heater activities, heat pump activities, etc., from smart meter data, may be built.

An automatic feature extraction and selection method may be provided to choose a set of features from the feature dictionary based on smart meter data, and other information such as prior marketing campaign sales information. A classification model and parameter tuning method may be provided to maximize appliance detection accuracy. The classification model and parameter turning method further may quantify efficiency of the detected appliance.

The details of the method and system are described below. In the description, heat pump is employed as an example appliance. Additional examples for feature extraction are provided employing electric water heater as an example appliance. However, it should be understood that the methodology disclosed herein may apply to detecting other appliances.

Figure 1:
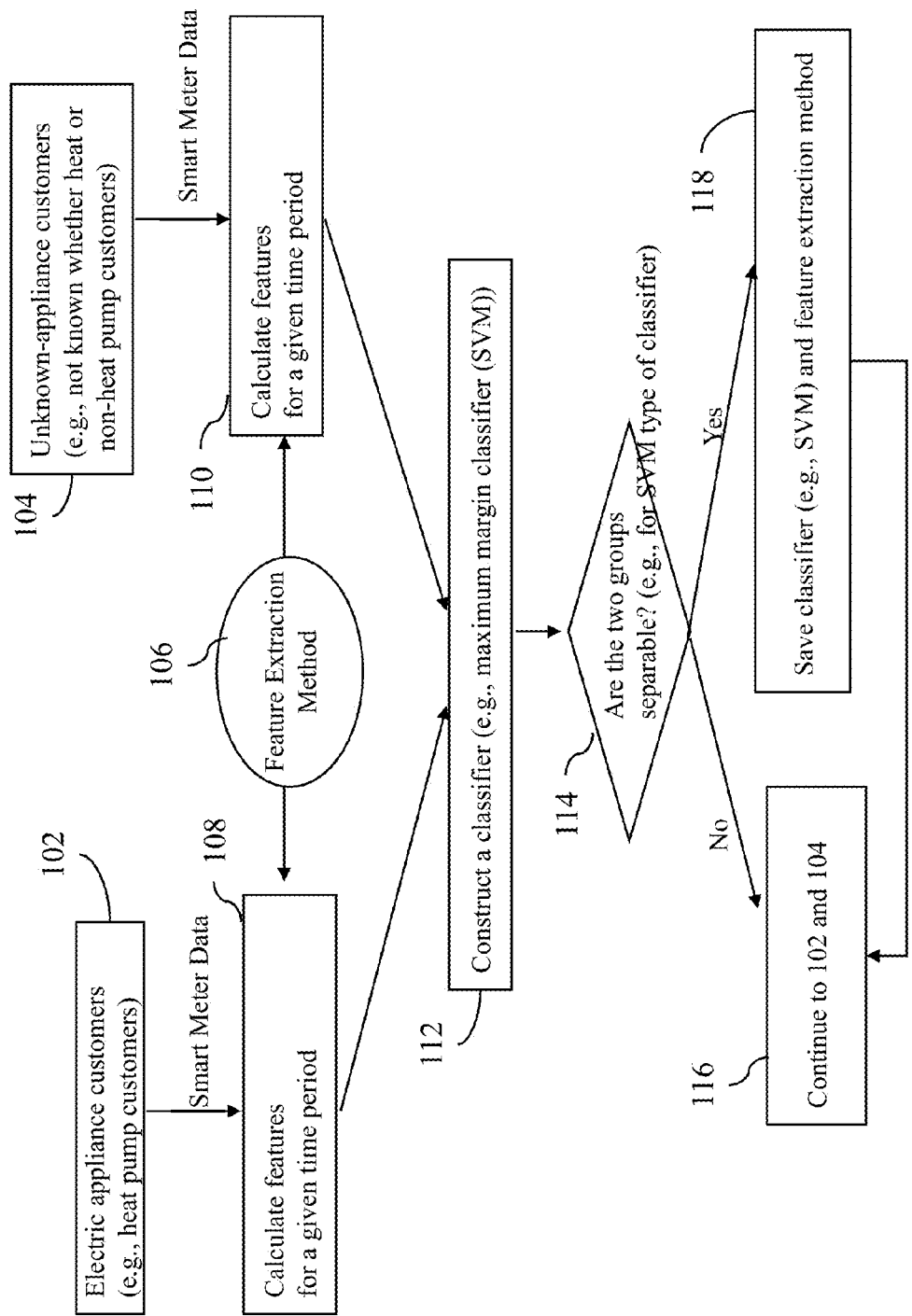
FIG. 1 illustrates an automatic model and feature selection algorithm in one embodiment of the present disclosure.

The methodology of the present disclosure in one embodiment may comprise feature extraction and appliance classification. A classification algorithm may be trained on a set of extracted features, and used as a predictive model that detects an appliance or appliance use. FIG. 1 illustrates an automatic model and feature selection algorithm in one embodiment of the present disclosure. At 102, energy consumption data (e.g., electricity usage data) is received. Such data comprise smart meter data, for example, obtained via smart metering infrastructure deployed by companies, e.g., utility companies. At 106, a feature extraction method is utilized, and at 108, features associated with appliance usage is calculated for a given time period. The feature extraction at 106 and 108 uses the smart meter data and also may use other information such as weather data. The meter data received at 102 is those of the customers who are known to use the appliance, e.g., heat pump customers.

At 104, smart meter data associated with unknown-appliance customers is received, and feature extraction is performed to calculate features for a given time period for the unknown-appliance data at 110, e.g., using a feature extraction method 106. Meter data of the unknown-appliance customers refer to usage data of energy (e.g., electricity) by customers who the system does not know whether they have (or use) the appliance or not have (or not use) the appliance.

Optionally, smart meter data associated with non-appliance customers may be received, and feature extraction may be performed to calculate features for a given time period for the non-appliance data similarly, e.g., using a feature extraction method 106. The data associated with non-appliance customers, e.g., those known to not use the appliance, is not required for the methodology of the present disclosure. Hence, the methodology may work only with a set of data associated with users of appliance and unknown users.

At 112, a classifier may be constructed based on the features extracted and/or calculated of appliance related data (e.g., at 108) and unknown-appliance data (e.g., at 110). Optionally non-appliance related data may be used. In one embodiment of the present disclosure, the classifier is a maximum margin classifier such as support vector machine (SVM). At 114, it is determined whether the two groups (appliance and non-appliance) are separable. The two groups are separable if there exists a reasonable decision boundary that separates two groups with a notable margin.

If it is determined that the two groups are separable, at 118, the constructed classifier is saved. The feature extraction method is also saved. The feature extraction method is saved so that each classifier knows how the feature extraction works. For example, an application programming interface (API) call to the feature extraction method or the feature extraction method itself may be associated with the classifier. In making a prediction, the classifier makes one or more calls to the feature extraction method, for unseen data, from which the feature are not extracted yet.

At 116, the processing may return to obtaining additional meter data, for example, to adjust and tune decision parameters, and further train the classifier.

Figure 5:
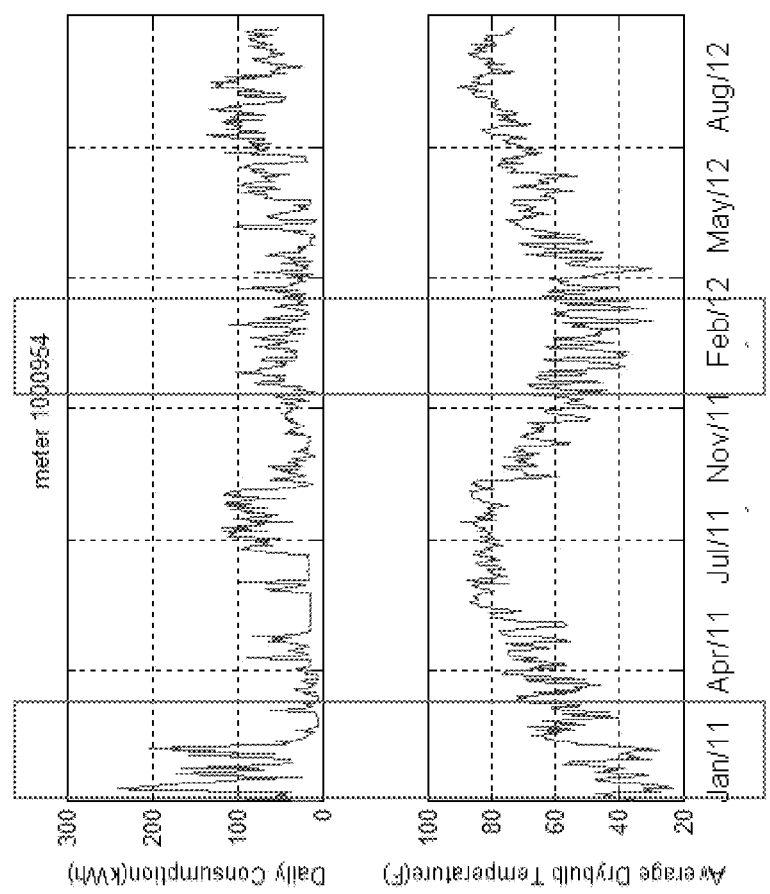
FIG. 5 shows example data plots for average drybulb temperature and daily consumption of energy.
Figure 6:
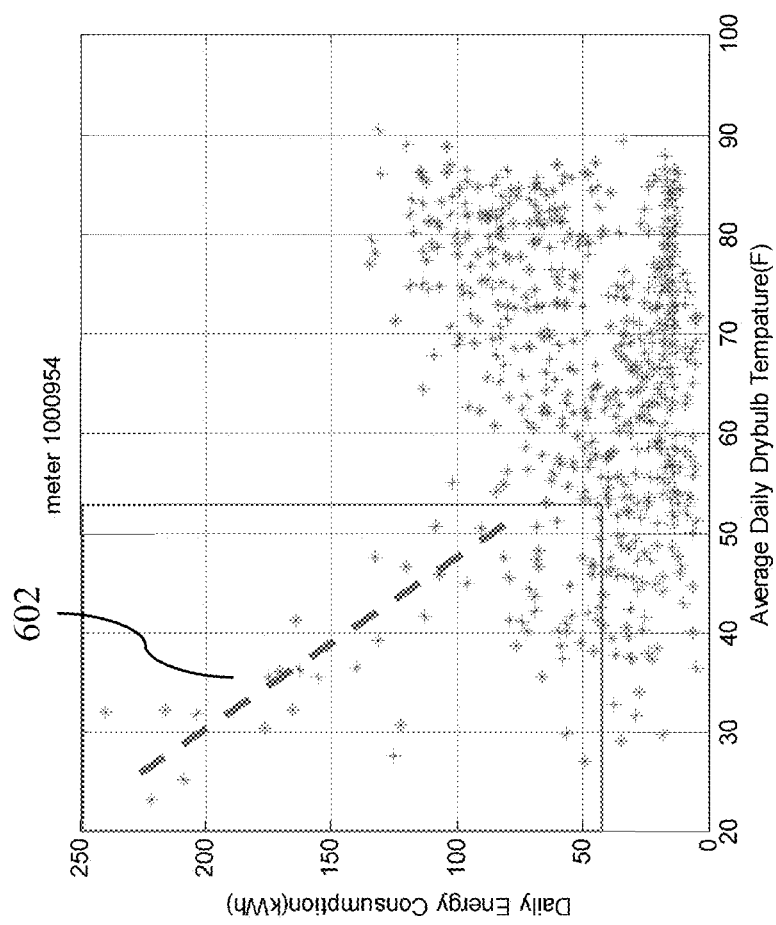
FIG. 6 shows a correlation between electric energy consumption and average drybulb temperature.
Figure 7:
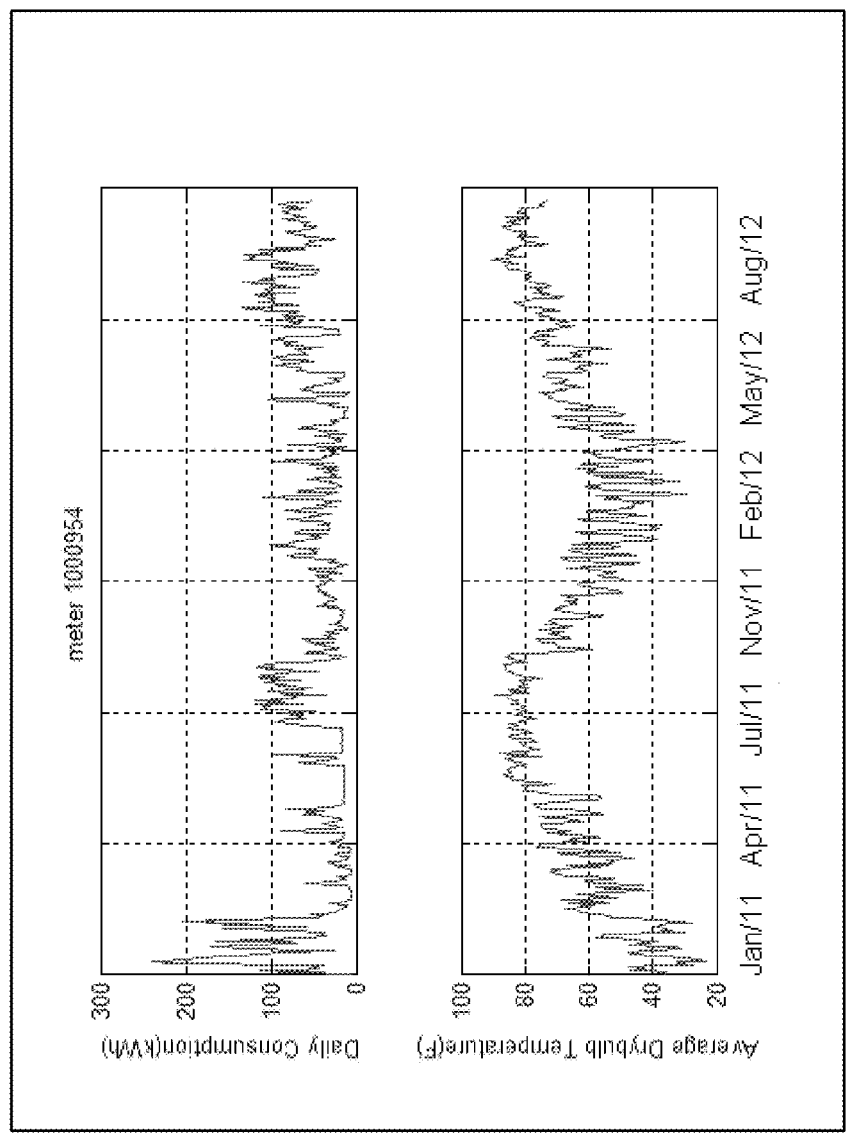
FIG. 7 shows data plotted for average drybulb temperature and corresponding daily consumption during the same period of time.

In one embodiment of the present disclosure, the features extracted from the smart meter data (e.g., at 106, 108, 110) may be different depending on which appliance is being detected. For example, for building a classifier for detecting a heat pump, candidate features comprise temperature dependent features such as correlation between electric energy consumption and average drybulb temperature. Drybulb temperature is the temperature measured freely in the air without radiation and moisture, which is considered as a variable in building energy loss and gain. For example, electric heat users show higher energy consumption when temperature is low, for instance, as shown in FIG. 5 example. FIG. 5 shows example data plots for average drybulb temperature and daily consumption of energy. FIG. 6 shows a correlation between electric energy consumption and average drybulb temperature. A correlation is shown as a slope 602 (dashed line) in the plotted data. FIG. 7 shows data plotted for average drybulb temperature and corresponding daily consumption during the same period of time (e.g., January to August), which illustrates temperature dependent consumption. Temperature dependent consumption data such as temperature dependent heating slope and temperature dependent cooling slope, ratio between cooling/heating and non-cooling/heating consumption data such as average energy consumption during cooling required days/average energy consumption during non-cooling required days, average energy consumption during heating required days/average energy consumption during non-heating required days, are examples of candidate features for building a model that would detect heap pumps. Statistical features and generic machine learning features, e.g., discrete Fourier transform coefficients and discrete wavelet transform coefficients are other examples of candidate features. Statistical features include mean consumption over different time of days, ratio between mean consumption of different time of days, ratio between consumption in cooling/heating required days and non-required days, sample variance of consumption in high demand periods.

FIG. 5 and FIG. 7 show an example consumption of the electric heat pump customers where the overall energy consumption increases when an outdoor temperature goes down below a certain threshold temperature when a space heating is required in January. This illustrates a strong correlation between temperature dependent energy consumption and the ownership information about the electric heat pump.

FIG. 6. illustrates the correlation between the energy consumption and outdoor temperature where the linear trend between energy consumption and temperature appears in a building where an electric heat pump operates.

Figure 8:
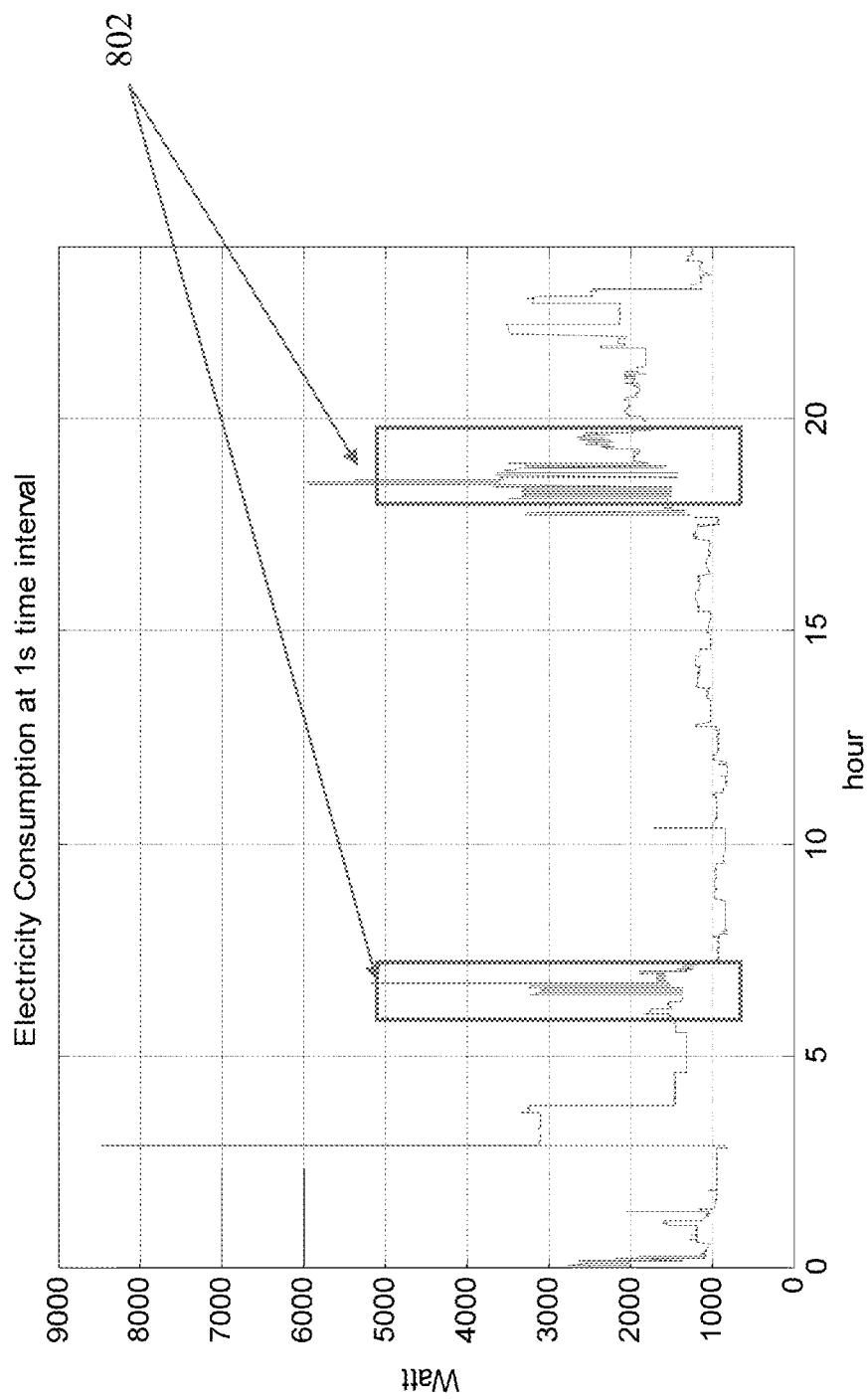
FIG. 8 shows example data plotted for electricity consumption over a period of time.

As another example, for constructing an electric water heater prediction model, candidate features extracted and calculated (e.g., at 106, 108, 110) may comprise hot water demand period, intense energy consumption for a short duration of time, spiky consumption patterns in the electricity usage or meter data, sample variance for high demand period (e.g., morning, evening, late night), peak count for high demand period (e.g., morning, evening, late night), the ratio of mean electricity consumption for high demand period and mean electricity consumption of the entire day, ratio between consumption in high demand period and consumption in low demand period, and statistical features such as discrete Fourier transform coefficients and discrete wavelet transform coefficients. FIG. 8, for example, shows data plotted for electricity consumption over a period of time. High demand periods, for instance, are annotated in rectangular boxes 802. Whether the demand is considered high or low may be quantified based on thresholds defined relative to the rest of the demand data. When electric heating devices operate, the consumption patterns show frequent switching because the devices control its desired temperature by pulse width modulation methods (e.g., by adjusting the duty cycle between on and off cycles). The particular pattern shown in FIG. 8 indicates a heating element from a water heater switching between on and off cycles frequently in its operation.

Figure 9:
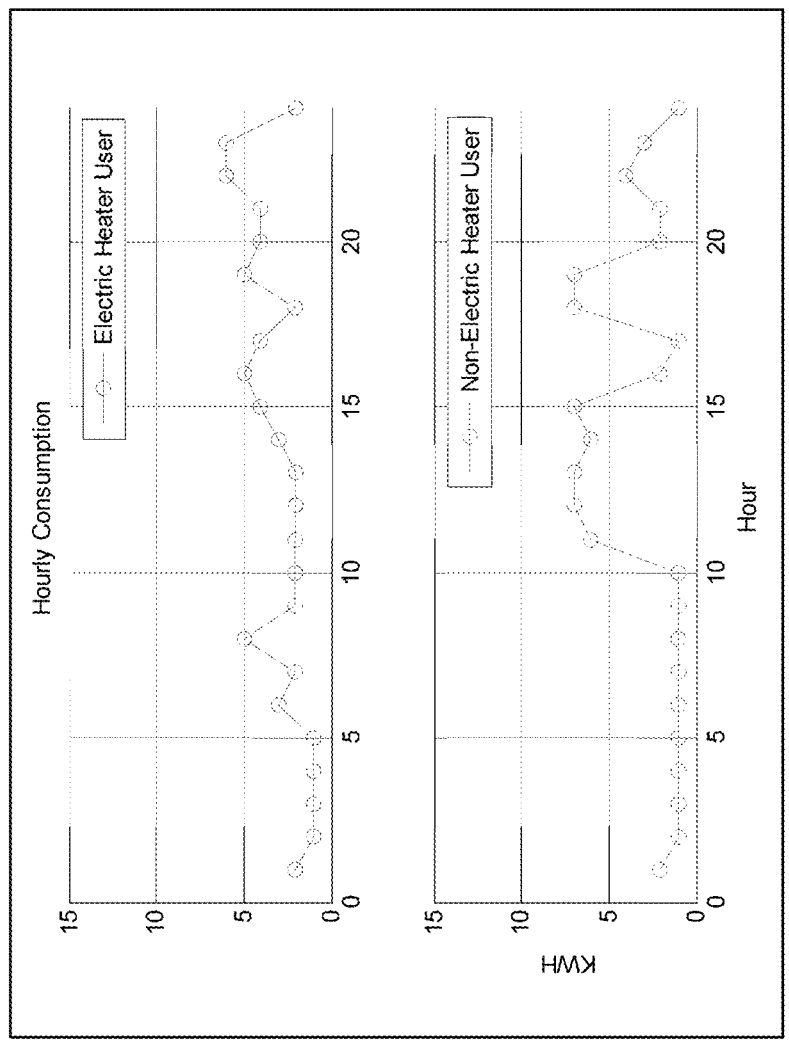
FIG. 9 shows example data plotted to illustrate hourly consumption of electricity for electric and non-electric heater users.

FIG. 9 shows example data plotted to illustrate hourly consumption of electricity for electric and non-electric heater users. The switching pattern may not be observed as clearly in the plot shown in FIG. 8, which is sampled at 1 Hz sampling frequency. Periodic fluctuation may be observed as shown in FIG. 9. For example, from 5 AM to 9 AM and 3 PM to 8 PM, there is slow-varying consumption pattern appearing from a building that has electric water heater.

A model that is constructed based on the extracted features (e.g., at 112) may be a machine learning algorithm. In one embodiment of the present disclosure, positive and unlabeled learning (PUL) may be adopted. Different from traditional supervised and semi-supervised learning where both positive and negative data are specified, the training data of PUL are composed of a set of positive data and a large amount of unlabeled data which can be positive or negative. Considering the heat pump detection problem, e.g., only a small portion of users having heat pumps from sales record data may be known. For the rest large amount of users, they may or may not have heat pumps. Hence PUL is suitable tool since it aims to fully exploit the unlabeled data together with the limited positive data to learn more precise predictive models. Two general approaches of PUL have been proposed. One is a two-step approach, in which a certain reliable negative samples are iteratively identified from the unlabeled data first and then traditional classifiers (e.g. SVM, Naïve Bayes) are applied to the reliable negative set and positive set.

The performance of such a two-step approach depends on the quality of the identified negative samples. The other approach is a one-step approach, in which all the unlabeled samples are treated as negative and the model is trained only once. For example, biased SVM is obtained by introducing different misclassification cost of the positive and negative samples to ordinary SVM. The underlying principle is that if the sample size is large enough, minimizing the number of unlabeled examples classified as positive while constraining the positive examples to be correctly classified will give a good classifier. Another example is logistic regression for positive and unlabeled learning (LRPU), which estimates the conditional probability of the positive class given input samples directly. Though the marginal probability of the positive class and the conditional probability of the labeled positive samples have to be estimated as an intermediate step, it provides competitive performance as biased SVM. After extracting features from daily consumption (and weather data, e.g., for heat pump detection), one of the method may be adopted for machine learning, for example, SVM (BSVM). Experimental studies show that BSVM outperforms LRPU on a real-world data set.

The following describes the details of feature extraction and classification algorithms using heat pump as an example appliance for detecting. In the formulations that follow, lowercase letters are used to represent scalar values, lowercase letters with bold font are used to represent vectors (e.g. x, w), uppercase letters are used to represent matrices, and uppercase calligraphic letters are used to represent sets. Unless stated otherwise, all vectors are column vectors.

In one aspect, a predictive model that detects heat pump users (households that have and/or use heat pump) is built given a smart meter data set P with daily consumption from known heat pump users (e.g., obtained from prior sales record and/or other reliable sources) as well as another set of daily consumption data U from unknown users over the same time period Feature Extraction (Heat Pump Example)

The energy consumption data over a time period can be naturally modeled as a one-dimensional time series. Without loss of generality, assume $x \in \{P \cup U\}$ is the consumption over discrete time stamps $t_1, t_2, \ldots, t_n$ for one particular user, then $x_i$ is the consumption at time $t_i$.

One way to learn with time series data is to treat the value at each time point as a feature. However, in one embodiment of the present disclosure, the size of the dimensionality of feature space is reduced. For instance, consecutive values of a time series are usually dependent, highly correlated and contain a lot of redundancy. Therefore, the feature extraction in one embodiment of the present disclosure may seek a good feature representation of time series that may speed up the learning algorithm and provide better performance.

In one embodiment, the feature extraction method may seek to choose empirical features that can capture characteristics of the heat pump detection problem. The following may be assumed. If there is an electric heating and cooling system in a building, daily average electric energy consumption will be higher if the outdoor temperature is low, or the indoor set temperature is high, or the building has high heat loss, and so forth. Potential empirical feature candidates are: temperature dependent heating parameter, temperature dependent cooling parameter, the ratio between the average energy consumption during the cooling period (e.g., in the U.S. east coast area, June to September) and the average energy consumption during non-cooling and nonheating period, and the average energy consumption during the heating period (e.g., in the U.S. east coast area, November to February) and the average energy consumption during non-cooling and non-heating period. Discussion of how to calculate them empirically based on energy consumption follows below.

In addition, the feature extraction method may use generic features of time-series data to capture additional characteristics between heat pump and non-heat pump users. Example feature extraction techniques for time series may include the Discrete Wavelet Transform (DWT) and the Discrete Fourier Transform (DFT). Both transformation methods divide up time series data into different frequency components and then study each component with a resolution matched to its scale. The main difference is that wavelets are localized in both time and frequency whereas the standard Fourier Transform is only localized in frequency. Another difference is that DWT is less computationally complex with O(n) time as compared to O(n log n) for the fast Fourier transform, where N is the length of time series. The DWT may produce better results in time series data mining tasks, such as clustering, classification and similarity search.

Temperature Dependent Heating Features

Temperature dependent heating features may include average consumption in the heating period, ratio between the average energy consumption during the heating period and the average energy consumption during non-cooling and nonheating period and temperature dependent heating parameter. Space heating and cooling systems run to maintain indoor temperature at desired temperature levels. An electric heat pump system heats up and cools down a space with a bi-modal heat exchange mechanism. When outdoor temperature is lower than indoor temperature, heat travels through the building envelope, walls, windows, and ceilings to outside. This heat is lost by conduction. Also, heat travels through leaks, which is called infiltration. When outdoor temperature is higher than indoor temperature, heat travels into the building by conduction, infiltration, radiation, people activities, and appliances activities. Generally, indoor temperature is settled when (1) heat gain and transferred heat from indoor to outdoor are balanced during summer and (2) heat loss and supplied heat are balanced during winter.

Once a building is built, building characteristics such as building envelop, walls, windows, ceilings, and openings do not change significantly over time. Only the outdoor temperature changes significantly day-by-day. Both conductive and infiltrative heat loss and gain are proportional to temperature difference between two thermal mass, which means that the space heating and cooling system consumes more energy when outdoor temperature is lower during winter and outdoor temperature is higher during summer.

Figure 10:
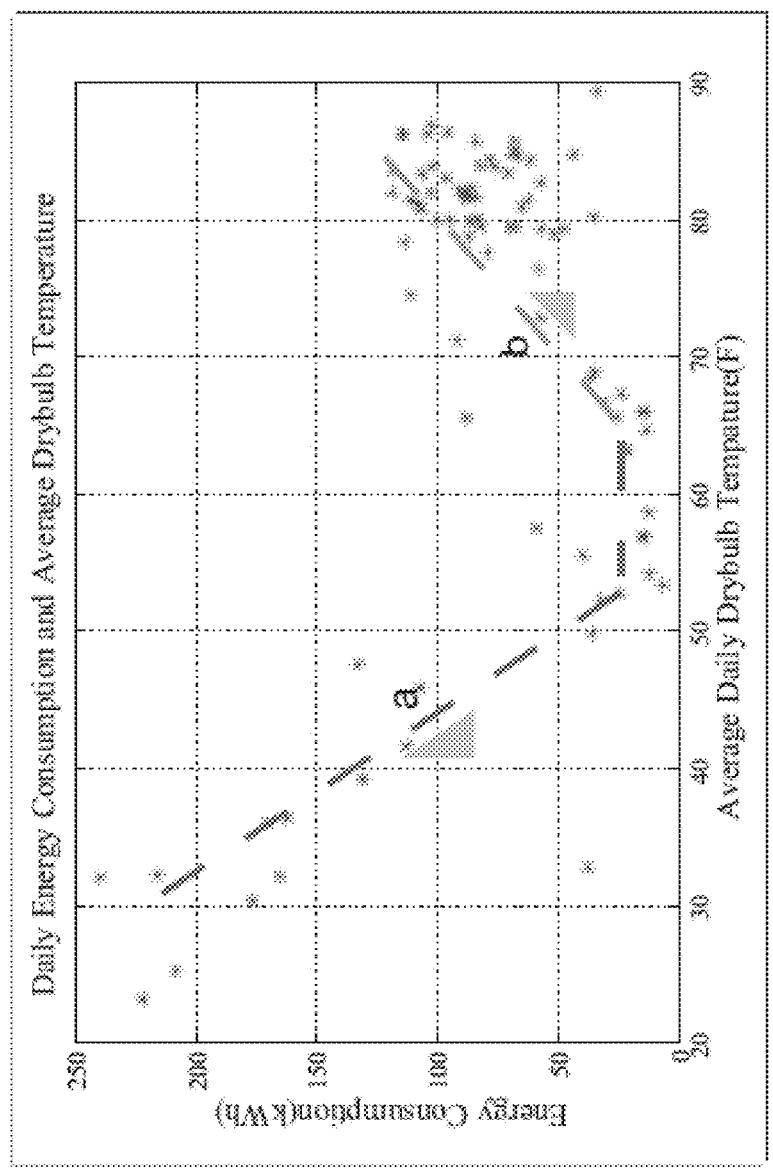
FIG. 10 illustrates an example data plotted for energy consumption in a house with an electric heat pump system.

FIG. 10 illustrates the drybulb temperature vs. electric energy consumption of a building where an electric heat pump is installed. There is a clear correlation between the outdoor temperature and electric energy consumption. In FIG. 10, $a$ and $b$ are the heating and cooling slopes, which represent cooling and heating energy requirement per temperature drop (kWh/degree).

This correlation is used to quantify heating and cooling efficiency of a building and to predict heating and cooling energy consumption. A model used to identify this correlation is a piece-wise linear regression model, which can be written as follows:

$$J = aT + J_{bh} + \lambda \quad \text{when } T \leq T_h \quad (1)$$
$$= J_b + \lambda \quad \text{when } T_h < T < T_c$$
$$= bT + J_{bc} + \lambda \quad \text{when } T_c \leq T$$

where J is a daily energy consumption in kWh, T is drybulb outdoor temperature, $J_{bh}$ is nominal energy consumption during heating required days, $J_{bc}$ is nominal energy consumption during cooling required days, $J_b$ is nominal energy consumption during heating required days, $\lambda$ is a random variable that has a certain probability distribution with bounded second moment, a and b are heating and cooling consumption slopes. $T_c$ represents temperature above which cooling is required; $T_h$ represents the temperature below which heating is required.

In buildings where there is no electric heating or cooling system, a and b are close to zero whereas in buildings with electric heat pump systems, a is a noticeable negative slope and b is a positive slope. In the present disclosure, the heating slope a is referred to as temperature dependent heating parameter and b is referred to as temperature dependent cooling parameter. In one embodiment of the present disclosure, only extract heating related features are extracted. In addition to the temperature dependent heating parameter a, the feature extraction method collects the average consumption in the heating period, the ratio between the average energy consumption during the heating period and during non-cooling and nonheating period. These two parameters are added to deal with electric heat pump users who have high variability in energy consumption during the heating period.

Wavelet Features

In addition to the above described temperature dependent heating for differentiating between heat pump and non-heat pump users, a set of generic features from energy consumption time series is extracted, e.g., in the time and frequency domain. In one embodiment of the present disclosure, discrete wavelet transform (DWT) is utilized to extract generic features. In one embodiment, Haar transform wavelet function is utilized. Haar transform can be viewed as a series of averaging and differencing operations on the time series. The averaging part captures the trend of time series called approximation, and the differencing part depicts the surprise named detail coefficients. To illustrate the procedure, the averages and differences between every two adjacent values of $x=(8, 6, 2, 10)^T$ are computed as shown in Table 1. The level 0 gives the original time series. In level 1, (7, 6) are obtained by taking the average of (8, 6) and (2, 10) respectively. (−1, 4) are the differences of (8, 6) and (2, 10) divided by 2 respectively. This process is repeated until level 2 (only one approximation coefficient left) is reached. The final Haar transform H(x)=(6.5, −0.5, −1.4) is obtained. From the Haar transformation, one can fully recover the original signal.

TABLE 1

Haar wavelet transform on a four element time series with different levels

| Level | Approximation | Detail coefficients |
|---|---|---|
| 0 | 8, 6, 2, 10 | |
| 1 | 7, 6 | −1, 4 |
| 2 | 6.5 | −0.5 |

Figure 11:
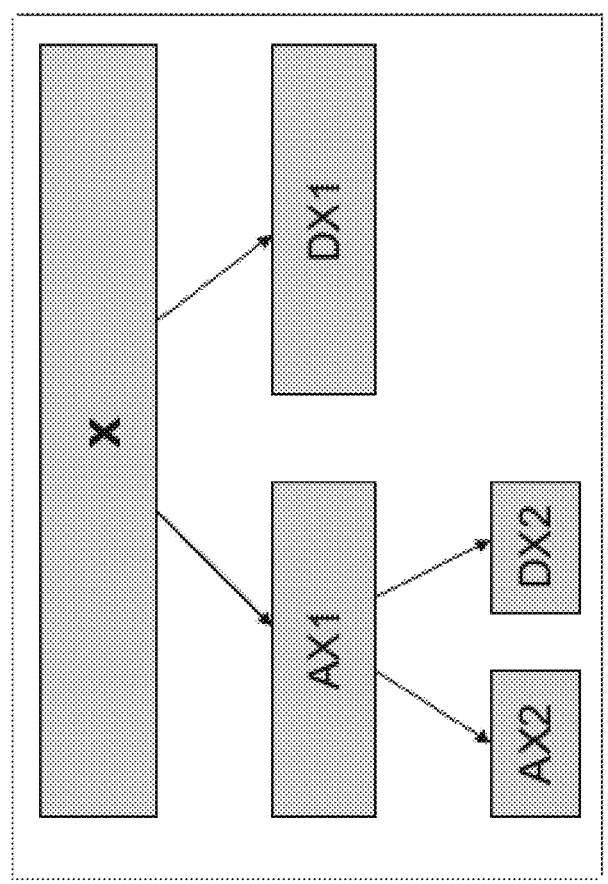
FIG. 11 illustrates an example tree structure of two-level Haar transformation, in which x is the input time series, AXi is the i-th level approximation and DXi is the detail coefficients.

The multi-level decomposition can be conveniently modeled as a tree shown in FIG. 11, in which the root mode represents the original time series, and left/right child represents approximations/detail coefficients respectively. While the example shows two-level decomposition, there may be even deeper decomposition for high dimension time series. Suppose k-th level DWT produces the best performance on validation set, then the transformed feature vector from x is given by $(AX_k, DX_k, DX_{k-1}, \ldots, DX_1)$. k can be tuned by cross-validation and k=2 may be fixed. An empirical study shows that k=2 gives the best performance. In one embodiment, DWT may be applied on the data of selected seasons, e.g., summer and winter. An embodiment of feature extraction method may only extract wavelet features from heating period, e.g. November to February.

Heat Pump Classification

Once features are extracted from heat pump users and unknown users, the problem is converted to a classification problem with positive and unlabeled data. In one embodiment of the present disclosure, biased SVM algorithm may be utilized. Suppose training sets are $\{(x_1, y_1), (x_2, y_2), \ldots, (x_n, y_n)\}$ where $x_i$ is the i-th input vector and $y_i$ is its class label, $y_i \in \{-1, 1\}$. Assume that the first l-1 examples are positive examples (labeled 1), while the rest are unlabeled examples, which is labeled as -1. If the sample size is large enough, minimizing the number of unlabeled examples classified as positive while constraining the positive examples to be correctly classified will give a good classifier. In particular, consider the following objective:

$$\min_{w,b} \frac{1}{2} w^T w + C_p \sum_{i=1}^{l-1} \xi_i + C_u \sum_{i=l}^{n} \xi_i$$

subject to (s.t.) $y_i(w^T x_i + b) >= 1 - \xi_i, i = 1, 2, \ldots, n$     (2)

$\xi_i >= 0, i = 1, 2, \ldots, n$ where $C_p$ and $C_u$ are regularization parameters to control the fitness for positive and unlabeled samples. $C_p$ and $C_u$ may be varied to enforce which part to be correctly classified. In one embodiment, a big value may be given for $C_p$ and a small value for $C_u$ because the unlabeled set, which is assumed to be negative, also contains positive data. The objective (2) is convex and a unique global solution exists. In one embodiment, the standard convex optimization package cvx may be used to solve the objective.

To choose $C_p$ and $C_u$, an approach may be to use a separate validation set or cross validation to verify the performance of the resulting classifier with the selected values for $C_p$ and $C_u$. A metric used may be the F1 score defined as F1=2pr/(p+r) where p is the precision and r is the recall.

In one embodiment, the psudo-F1 metric:

$$\text{psudo} F1 = r^2/Pr(f(x)=1) \quad (3)$$

may be followed, where Pr(f(x)=1) is the probability that a user is classified as heat pump user. r can be estimated using the positive examples in the validation set and Pr(f(x)=1]) can be estimated from the whole validation set. This criteria works because it behaves similarly to the F1 score in the sense that it is large when both p and r are large and is small if either p or r is small.

Figure 2:
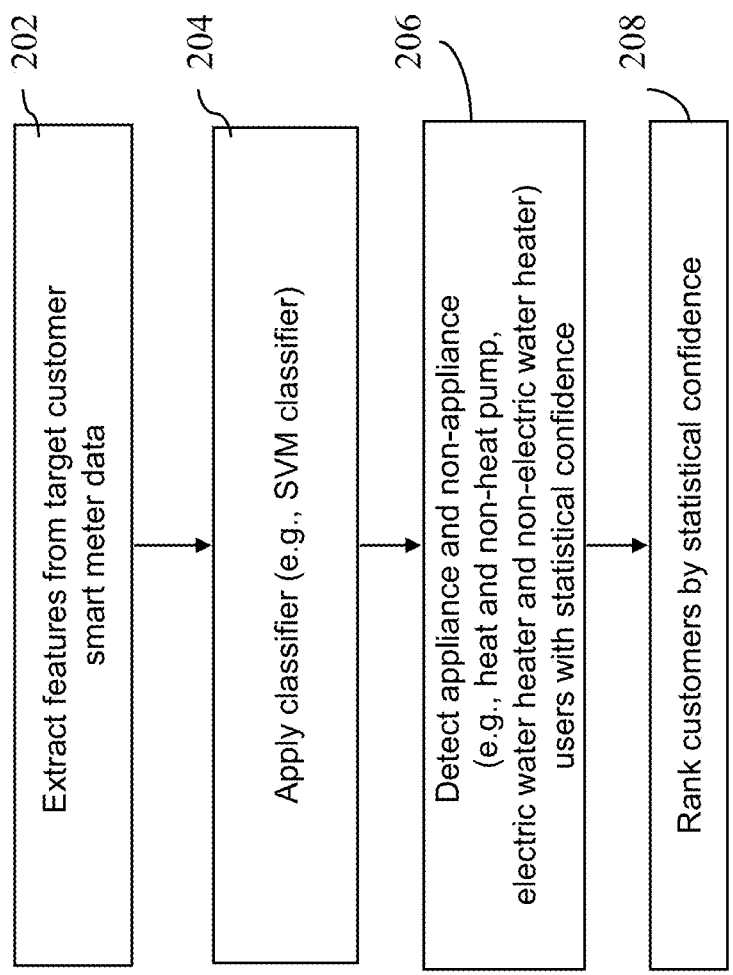
FIG. 2 is a high-level flow diagram illustrating a detection of appliance in a household or building in one embodiment of the present disclosure.

FIG. 2 is a high-level flow diagram illustrating a detection of appliance in a household or building in one embodiment of the present disclosure. At 202, smart meter data associated with a target customer is obtained or received and features are extracted from the customer data. At 204, a classifier, for example, built according to a method of the present disclosure, for instance, as described with reference to FIG. 1 and in this disclosure, is applied to the features extracted from the meter data of candidate customer with demographic data. As discussed above, an example classifier is an SVM classifier. The processing at 202 and 204 may be performed for multiple candidate customers. At 206, based on applying the classifier on each candidate customer data, appliance and non-appliance customers may be detected. In one aspect, extracting of features comprises pre-processing "raw" data. Once the features are extracted, a classifier can be used to classify users into different categories.

At 208, customer may be ranked by statistical confidence. An example method of calculating statistical confidence is to use the distance between a user and a centroid of a cluster in the feature space. Another example method is to calculate the distance between a user and the separating hyper-plane in the feature space. The distance can be a normalized L-norm (e.g. a Euclidean distance or a 1-norm). Or a ratio between the distance between a user and two centroids of two clusters (if it is a binary decision) may be used.

Statistical confidence values may be combined with responses of particular customers with demographic attributes, using for example, a pre-defined linear combination. For example, the statistical confidence can be used to target the top customers who do not operate target appliances. This response rate can be further improved by prioritizing those who have other demographic attributes, e.g., that are related to marketing campaigns. An example of a demographic attribute may be the education level of customers that might affect response rate to energy efficient appliance rebate program. The linear combination of statistical confidence values and demographical matching can give a more confident value.

In one aspect, the extracted features are used by support vector machine classifiers to adjust and tune model parameters (w in Eq. (2)). The decision parameters can be tuned by quantifying the quality of the decision boundary, e.g., the separability metric. By iteratively choosing/removing features, the classifier optimizes the classifier quality.

In another aspect, the feature to extract and classifiers may be chosen that maximize the classification accuracy while balancing recall and precision. This aspect is to fulfill the requirement from the target accuracy, e.g., where the marketing campaign often has required percentage of target population. This aspect forces the biased SVM to meet this requirement by adjusting $C_p$ and $C_u$ in (2).

Figure 3:
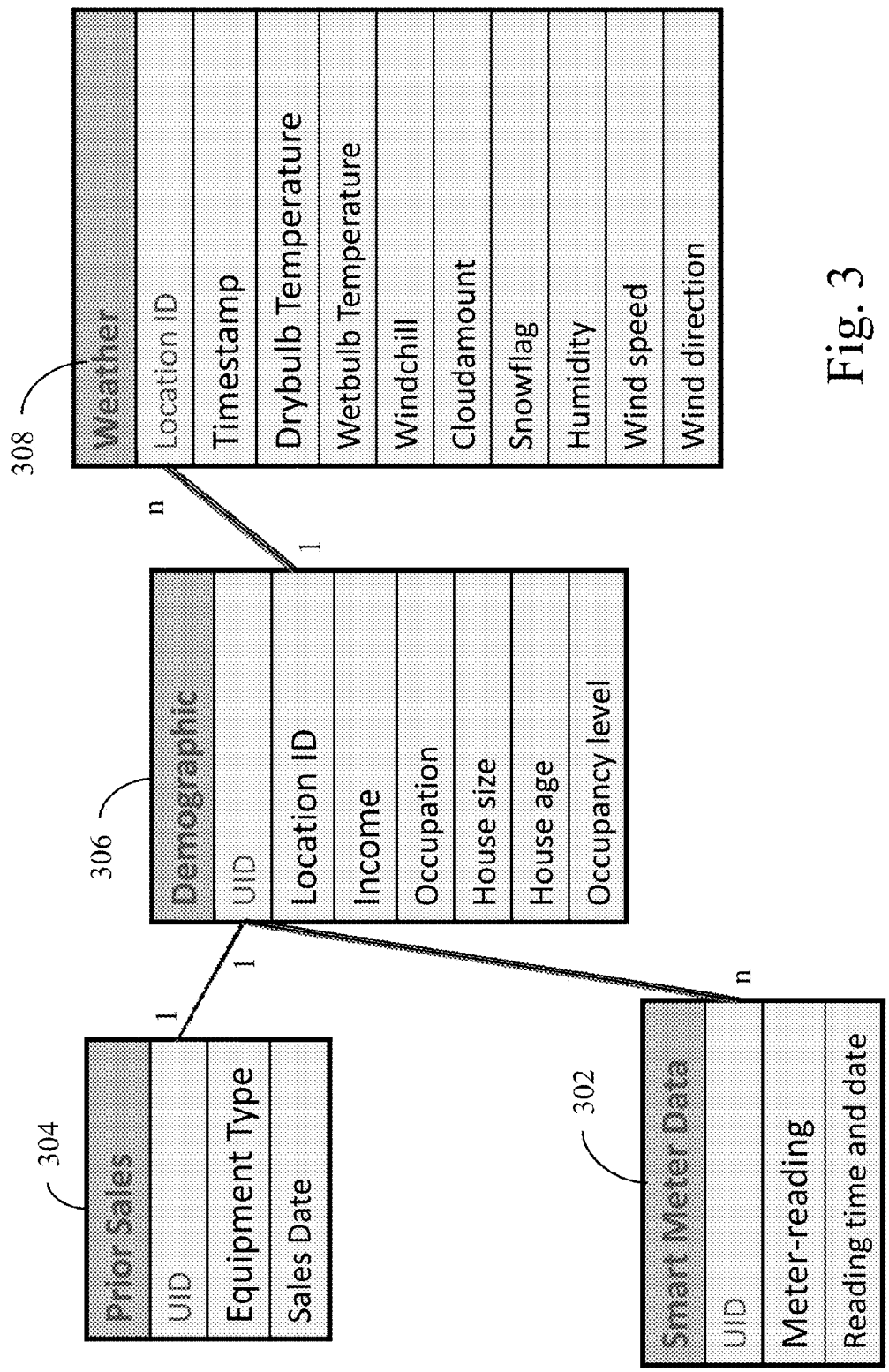
FIG. 3 illustrates an example data model or structure that may be used for detecting appliance/non-appliance in a household or a building or the like in one embodiment of the present disclosure.

FIG. 3 illustrates an example data model or structure that may be used for detecting appliance/non-appliance in a household or a building or the like in one embodiment of the present disclosure. Smart meter data 302 may comprise a user identifier, meter reading data, and time and date of the reading. As discussed above, smart meter data is used in feature extraction. Prior sales 304 data may be used to optimize the accuracy of the classifier by running the accuracy of the detection before and after the purchase of the target appliances. Demographic data 306 may comprise information about the household or building. For example, the demographic data may be used to further mine the customers' trend, e.g., to respond to certain marketing campaigns by combining the prior sales data (to train the trend model) and applying the demographic attribute based weighting. Weather data 308 comprises data about the weather conditions, which are used to extract features as described above.

Figure 4:
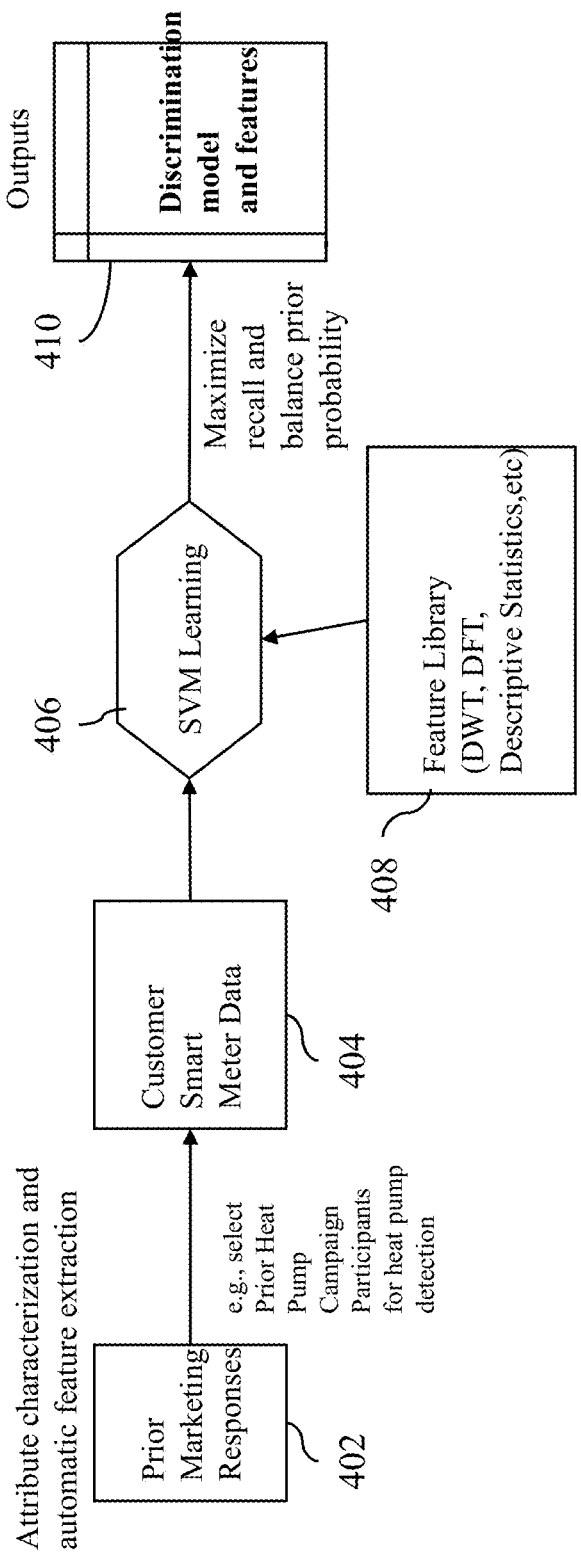
FIG. 4 illustrates attribute characterization and automatic feature extraction for automated learning of response characteristics and discrimination models in one embodiment of the present disclosure.

FIG. 4 illustrates attribute characterization and automatic feature extraction for automated learning of response characteristics and discrimination models in one embodiment of the present disclosure. At 402, prior marketing data, for example, responses from customers, may be used to determine a set of customers whose data may be used in building an appliance detection model. This data may provide certainty in data as to which customers are known to use the appliance or not use the appliance for appliance detection model training. For instance, for detecting electric water heater, smart meter data may be selected from known electric water heater users, known non-electric water heater users, and from unknown users. At 404, smart meter data is obtained, e.g., including for those customers selected at 402.

At 406, machine learning is performed, e.g., a classifier is built based on extracted features (feature library), and statistical feature extractions, 408 for example as described above. The classifier may be adjusted by iterative learning methodology. At 410, a predictive model (e.g., adjusted classifier) is produced as the output.

In one aspect, smart meter data used in the present disclosure may be fine grained or coarse grained. For instance, an approach to detect heat pumps as appliance may utilize low granularity smart meter data, prior sales data and weather data. In particular with respect to heat pumps, for example, heat pump consumption pattern may be used to extract features that are highly relevant to heat pump usage from smart meter data and weather data. For instance, under the constraint that only a subset of heat pump users is available, an appliance detection methodology of the present disclosure in one embodiment may formalize the problem into a positive and unlabeled data classification and apply biased Support Vector Machine (BSVM) to the extracted features.

In one aspect, the methodology of the present disclosure need not rely on special sensors such as at a device or at power outlet, a high sampling rate data or prior domain knowledge of appliance signatures (e.g., power consumption, on or off state current). For example, the methodology of the present disclosure may work with partially labeled data, which are the most data typically available to the utility companies.

For instance, using heap pump as particular appliance for detecting, an approach of the present disclosure may detect such appliance from coarse grained data with daily consumption and partial labeling information. More specifically, the methodology of the present disclosure in one embodiment for heap pump detection may utilize low granularity smart meter data, prior sales data and weather data to extract relevant features related with heat pump usage. The approach does not have any assumption about the access to individual device consumption or the prior knowledge of any appliance signature, but correlates the daily consumption with temperature and extracts features specific to heat pump usage.

Given the fact that only a small portion of heat pump users are available from prior sales record (also known as a partially positive labeled data), such a problem is characterized by positive and unlabeled data learning, in which "positive" represents the small portion of users with heat pumps and "unlabel" means the rest large population that may or may not have heat pumps. In one embodiment, the methodology may apply a biased SVM learning algorithm that is designed specifically for positive and unlabeled data classification, to the extracted features.

Thus, in one aspect, a step to detect a particular appliance may do so from coarse grained data compared with other methods which may depend on fine grained data. At a system level, a methodology of the present disclosure may integrate different data sets from different sources, e.g., including smart meter data, prior sales record and weather data, to perform feature extraction and heat pump detection. At a modeling level, the methodology of the present disclosure may formulate a problem of appliance detection as a positive and unlabeled data classification problem and apply a classification or like algorithm to the extracted features, e.g., including temperature dependent features related with heating and wavelet features from heating period (e.g., from November to February in East Coast of U.S.).

In one aspect, a methodology of the present disclosure may be considered as building a model that detects a particular appliance (e.g., heat pump) based on coarse grain data (e.g., rather than detecting all appliances from a very fine granularity data). The methodology may integrate different data sources into a unique system, e.g., in which sales record and weather data (in case of detecting heat pump) may be utilized to guide more effective detection.

Such data, for instance, may be obtained from or at a utility company. For instance, for heat pump detection, a smart meter data set during a period of time (e.g., daily consumption from January to September) and a heat pump sales data set from a utility company may be obtained.

Based on the sales record, electrical heat pump users who purchased heat pump and non-heat pump users may be obtained. The weather data for each region where the users reside may be obtained in the same time period as smart meter data. Non-heat pump users may be treated as unlabeled samples and randomly sampled (e.g., 10%) heat pump users may be treated as additional unlabeled samples. From the data, features specific to heating may be extracted in one embodiment. The features may include temperature dependent heating parameter, average daily consumption during heating period, the ratio between average consumption during heating period and other time periods other than heating or cooling period and 2-level wavelet transform coefficients from the time series of consumption in heating period, for instance, as discussed above. The extracted features may be partitioned into a training data set and a testing data set. Optimal parameters may be selected for SVM based on a defined pseudo-F1 score. An appliance detection model may be generated (e.g., as discussed above) from the training data set, e.g., with the selected parameters. The model may be applied to the test data set for evaluating accuracy. The model may be used to predict or detect an appliance (e.g., heat pump) used by a particular customer using that customer's meter data. Ordinary SVM and logistic regression for positive and unlabeled data classification are examples of other algorithms. In an experimental study, BSVM produced results with high recall (the algorithm predicts most positive samples correctly) and a reasonable precision.

In one aspect, a methodology of the present disclosure may be utilized in marketing campaigns. For instance, a company may market to customers who are predicted as non-appliance (e.g., non-heat pump users, non-electric water heater users) by the methodology of the present disclosure. Hence, a targeted energy efficient marketing campaign can be run. For instance, electric companies may desire to run various energy efficient marketing campaigns for encouraging their customers replace inefficient appliances with more efficient alternatives.

As described above, the methodology of the present disclosure may produce results even in cases in which (1) the input data is only partially labeled with only a subset of positive samples; and (2) only the extremely coarser grained energy consumption data is available for the detection algorithm due to the type of smart meter reading infrastructure. With such data, for example, in one embodiment, the detection problem may be formulated as a positive and unlabeled data learning problem and biased SVM adopted to solve it. Both empirical features and generic features relevant to appliance usage may be extracted (e.g., heat pump usage in heating period) for classification.

In one embodiment of the present disclosure, a user interface may be created and/or provided for enabling analytics for users who desire to use the methodology for appliance detection, e.g., for presenting graphical analyses, e.g., for utility companies.

Figure 12:
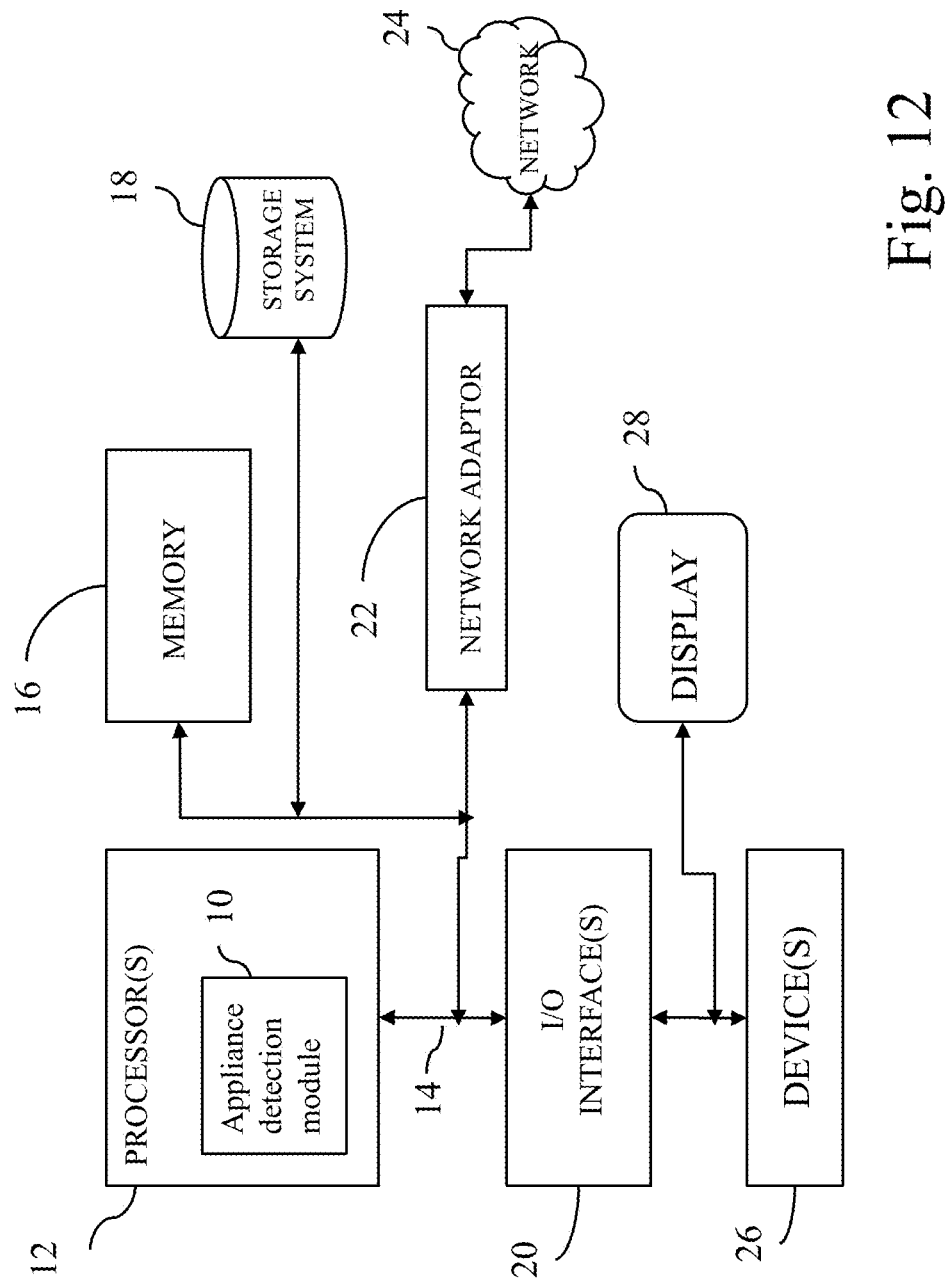
FIG. 12 illustrates a schematic of an example computer or processing system that may implement an appliance detection system in one embodiment of the present disclosure.

FIG. 12 illustrates a schematic of an example computer or processing system that may implement an appliance detection system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an appliance detection module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for detecting appliance in a building comprising:
   a processor;
   a program module, executed by the processor to perform the steps of:
   receiving meter data associated with energy consumption, the meter data comprising at least energy consumption data associated with usage of the apliance;
   receiving customer data associated with the meter data;
   extracting features for training a computer model to detect the appliance, based on at least the meter data and the customer data;
   computing empirical features and statistical features from the extracted features, wherein the empirical features include temperature dependent heating consumption, ratio between average consumption during heating required days and during non-heating required days, and the statistical features comprising at least one of discrete Fourier transform coefficients or discrete wavelet transform coefficients;
   constructing the computer model based on at least the empirical and statistical features;
   applying the computer model to meter data associated with a candidate customer, to detect whether the candidate customer is using the appliance, wherein the customer data comprising data associated with customers known to use the appliance and data associated with customers unknown to use or not use the appliance, and wherein the computer model is built at least based on the features extracted from the data associated with customers known to use the appliance and the data associated with customers unknown to use or not use the appliance.

2. The system of claim 1, wherein the energy consumption comprises electricity consumption.

3. The system of claim 1, wherein the computer model is constructed to detect a heat pump, and the extracted features are at least based on the meter data, the customer data, and weather data during same time period of meter data.

4. The system of claim 1, wherein the computer model is constructed to detect an electric water heater, and the program module computes the empirical features comprising at least sample variance in morning, evening, and late night, peak count in morning, evening, and late night time, and ratio between consumption in defined high demand period and consumption in defined low demand period.

5. The system of claim 1, wherein the module employs a machine learning algorithm to construct the computer model.

6. The system of claim 1, wherein the computer model comprises a support vector machine classifier, and the features are used by the support vector machine to adjust and tune decision parameters.

7. The system of claim 1, wherein the meter data further comprises additional energy consumption data in which it is unknown whether the energy consumption data includes usage of the appliance.

8. The system of claim 1, wherein the module is further operable to apply the computer model for a plurality of candidate customers, and rank the plurality of candidate customers based on statistical confidence value.

9. A non-transitory computer readable storage device storing a program of instructions executable by a machine to perform a method of detecting appliance in a building, the method comprising:
   receiving meter data associated with energy consumption, the meter data comprising energy consumption data that at least incorporates use of the appliance and additional energy consumption data in which it is unknown whether usage of the appliance is incorporated or not;
   receiving customer data associated with the meter data;
   extracting features for training a model to detect the appliance, based on at least the meter data and the customer data;
   computing empirical features and statistical features from the extracted features, wherein the empirical features include temperature dependent heating consumption, ratio between average consumption during heating required days and during non-heating required days, and the statistical features comprising at least one of discrete Fourier transform coefficients or discrete wavelet transform coefficients;
   constructing the model based at least on the empirical and statistical features;
   and applying the model to candidate meter data associated with a candidate customer, for detecting whether the candidate customer is using the appliance,
   wherein the customer data comprising data associated with customers known to use the appliance and data associated with customers unknown to use or not use the appliance, and wherein the computer model is built at least based on the features extracted from the data associated with customers known to use the appliance and the data associated with customers unknown to use or not use the appliance.

* * * * *